T. F. BOURNE.
SHIELD FOR AUTOMOBILES.
APPLICATION FILED JUNE 8, 1911.
1,014,366.
Patented Jan. 9, 1912.
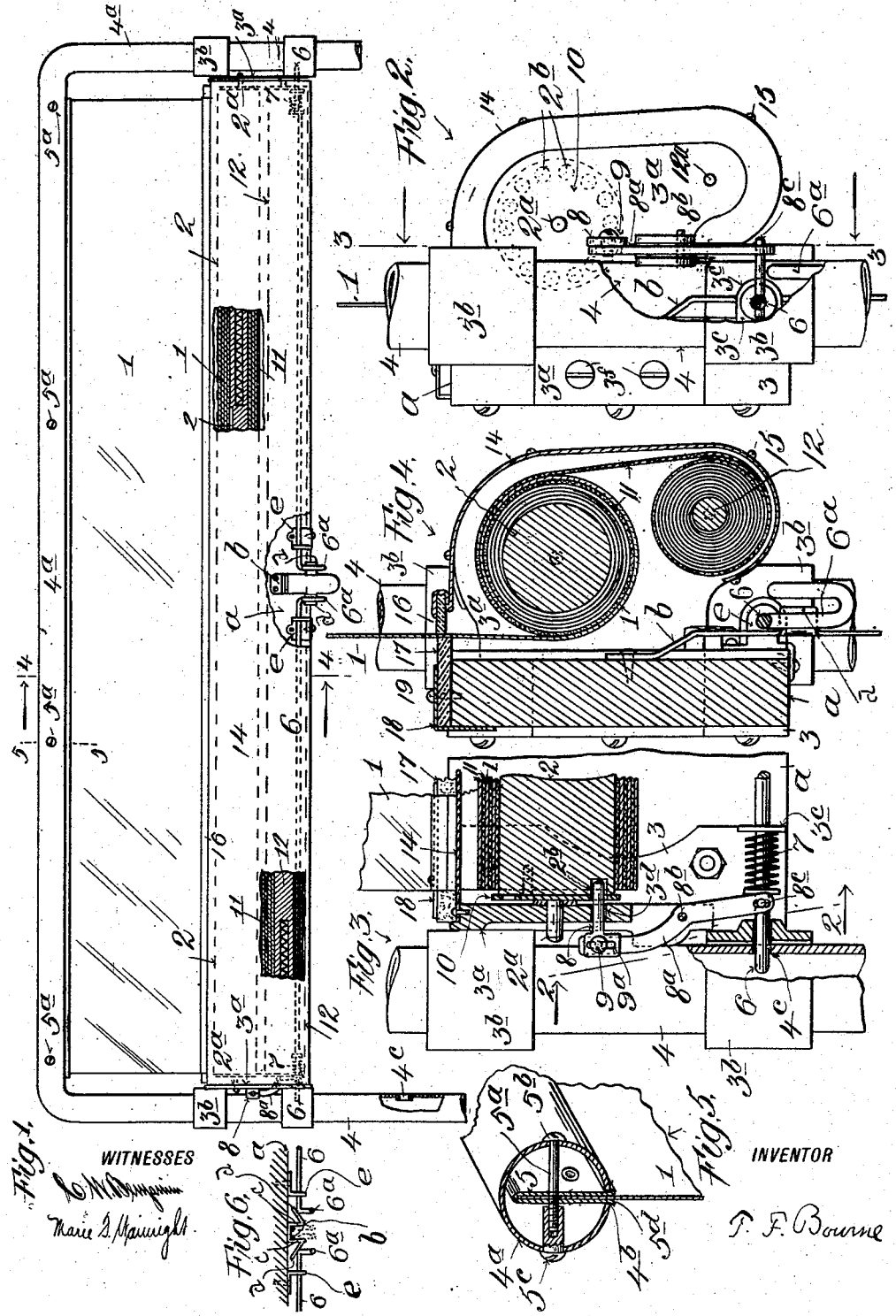
WITNESSES
INVENTOR
T. F. Bourne

UNITED STATES PATENT OFFICE.

THEODORE F. BOURNE, OF MONTCLAIR, NEW JERSEY.

SHIELD FOR AUTOMOBILES.

1,014,366.  Specification of Letters Patent.  Patented Jan. 9, 1912.

Application filed June 8, 1911. Serial No. 631,880.

*To all whom it may concern:*

Be it known that I, THEODORE F. BOURNE, a citizen of the United States, and resident of Montclair, Essex county, New Jersey, have invented certain new and useful Improvements in Shields for Automobiles and other Vehicles, of which the following is a specification.

In my applications for patent on shields for automobiles and other vehicles, filed December 24, 1910, Serial No. 599,117, I have set forth a wind shield having spaced longitudinally adjustable supports and a transparent flexible shield connected at one end with said supports and at the other end with a roller, with means for maintaining said supports and flexible shield in different elevated positions, and my present improvements may be utilized in conjunction with the said wind shield.

The object of my present invention is to provide means to keep the convolutions of the transparent flexible material from contact with each other when wound upon the roller.

My invention comprises novel details of improvement and combinations of parts that will be more fully hereinafter set forth and then pointed out in the claims.

Reference is to be had to the accompanying drawings forming part hereof, wherein, Figure 1 is a partly broken face view of my improved wind shield looking at the same from the rear or in the direction of travel; Fig. 2 is an enlarged detail end view looking from the left in Fig. 1, shown partly in section on the line 2, 2, in Fig. 3; Fig. 3 is a section substantially on the line 3, 3, in Fig. 2; Fig. 4 is a section, enlarged, on the line 4, 4, in Fig. 1; Fig. 5 is an enlarged cross section on the line 5, 5, in Fig. 1, and Fig. 6 is a detail plan view of part of the locking devices for the longitudinally adjustable supports.

Similar numerals of reference indicate corresponding parts in the several views.

The numeral 1 indicates a flexible shield, partly or wholly of suitable transparent material, such as celluloid, fiberloid or the like, and 2 indicates a suitable spring-acting roller upon which the flexible shield 1 is mounted to be wound, in the nature of the ordinary shade roller, which roller may be ratchetless. Brackets 3 are secured upon a board or the like $a$ and spaced apart by the latter, which board may be attached to a dash board or other suitable part of a vehicle, or the brackets 3 may be connected directly to the latter. Said brackets are provided with alined guides $3^b$ shown in hollow or tubular form slidably receiving for longitudinal adjustment the spaced supports or uprights 4 that are connected with the free end of the flexible shield 1. The upper ends of the supports 4 are spaced and firmly connected by a transverse member $4^a$ comprising a tube, rod or bar, the supports 4 being free from each other below member $4^a$. The parts 4, $4^a$ may be in a single piece of tubing or the like, bent to the desired shape, or may be in separate parts, connected together, as by elbows at the corners. The supports 4, $4^a$, are shown in yoke-like form and may be of suitable depth and width, and are arranged for easy sliding movement through the guides $3^b$, whereby the flexible shield 1 will be raised and lowered correspondingly by and with said supports, and will unwind from or wind upon roller 2 as said supports are adjusted in the corresponding direction. The foregoing parts are set forth in my said application Serial No. 599,117.

To securely and yet detachably connect the flexible shield material 1 with its transverse supporting member $4^a$, I secure a binding 5, by means of eyelets or the like, along the upper edge of material 1, said binding being preferably of relatively thin sheet metal, of one or two ply, whereby the upper edge of material 1 is stiffened. The transverse member $4^a$ is provided with a longitudinally disposed slot $4^b$ along its under side, through which slot the binding 5 with the upper marginal portion of flexible material 1 is passed into the tubular member $4^a$, and across the member $4^a$ are hangers or supports $5^a$ for the parts 1, 5 (see Fig. 5). While the supports $5^a$ may be of suitable construction, such as bolts or screws, I have illustrated two-part bolts or screws, the male screw-threaded portion $5^b$ passing through a suitable hole in member $4^a$ and through a corresponding hole in the parts 1 and 5, and entering the female threaded portion $5^c$ that passes through a hole in the opposed wall of transverse member $4^a$. There may be any desired number of the supports $5^a$, (arranged as shown in Figs. 1 and 5), whereby binding 5 is suspended from and mainly concealed within the transverse member $4^a$, and the supports $5^a$ may be screwed firmly in place to brace the slotted member $4^a$. The lower edge or edges $5^d$ of binding 5 preferably project below the slot $4^b$ of member $4^a$, to protect the flexible transparent material 1 from abrasion and injury at the edges of such slot. By the means described the flexible shield may be readily detached from and applied to the transverse supporting member $4^a$, since the supports $5^a$ may be readily disconnected and the binding slipped in and out of member $4^a$.

The pivots $2^a$ of roller 2 are carried by braces or extensions $3^a$ of brackets 3, which extensions may be formed on the brackets as set forth in my said application Serial No. 599,117, or may be in the form of detachable plates held by screws $3^t$.

To maintain the sliding supports 4 in the desired positions of longitudinal adjustment and elevation I have shown locking devices comprising stops, illustrated in the form of slidable bolts 6, guided in bearings on brackets 3, adapted to enter suitably spaced and opposed openings or sockets $4^c$ in supports 4. Springs 7 are shown bearing against bearings or stops $3^c$ on the brackets and against suitable projections on bolts 6 to maintain the latter projected into the corresponding openings $4^c$. Said locking devices are substantially as in my aforesaid application, but herein I have shown different means for holding the stops or bolts 6 withdrawn from supports 4 and for releasing the former. To this end the stops or bolts 6 are shown extended toward the center portion of the shield, and along the rear face of board $a$, and at a suitable position, preferably about midway of board $a$, said bolts are provided with finger pieces $6^a$ suitably spaced apart for convenient manipulation and are guided by bearings $e$. For locking the finger pieces when pressed toward each other, and for readily releasing the same, I have illustrated a catch piece or plate $b$ secured to one end to board $a$ and free at the other end to move relatively toward and from the board, the free end of the piece $b$ being suitably spaced from said board for such movement. The piece $b$ is provided on opposite sides with outwardly extended spaced ears $c$ from which diverging or cam-like webs or portions $d$ project toward board $a$. The normal position of said parts is shown in Fig. 6, wherein the finger pieces $6^a$ are adjacent the cam-like pieces $d$, the bolts 6 then being projected by the springs 7 into the openings $4^c$ of supports 4. When the supports 4 are to be released, to be raised or lowered, the finger pieces $6^a$ are pressed together to withdraw bolts 6 from said supports 4, and the finger pieces $6^a$ will slide against the cam-like webs $d$ and move them and part $b$ toward board $a$; when the finger pieces $6^a$ pass the ears $c$ the parts $b$, $c$ and $d$ spring outwardly, and the ears $c$ retain the pieces $6^a$, as indicated in dotted lines in Fig. 6, whereby bolts 6 are held retracted from the openings $4^c$ of supports 4, at which time said supports and flexible shield may be raised or lowered. To cause bolts 6 to again engage the supports 4 the part $b$ at its free end is pressed toward board $a$, thereby carrying the ears $c$ back of the parts $6^a$ and releasing bolts 6. The foregoing arrangement provides a simple and efficient means for operating the bolts 6 and retaining them withdrawn from supports 4, and for readily releasing the same simultaneously.

Locking pin 8 for roller 2 is shown guided in a bearing or hole $3^b$ in plate $3^a$ and operatively connected with a lever $8^a$ that is pivotally supported, at $8^b$, upon plate $3^a$, the lever $8^a$ being connected with one of the bolts 6, as by a pin $8^c$ projecting from said bolt through an opening in lever $8^a$. I have shown the parts 8, $8^a$ movably connected so that the pin 8 may slide properly in its bearing $3^d$ notwithstanding the pivotal movement of lever $8^a$. To this end I have shown a screw or pin 9 carried by lever $8^a$ and passing through an upwardly disposed slot $9^a$ in the head portion of pin 8, the head of screw 9 serving to retain pin 8 in proper position upon lever $8^a$. The bearing $3^d$ is shown close to the end of roller 2, whereby strain of the roller upon the pin 8 is reduced owing to the juxtaposition of the parts. The recesses or teeth $2^b$ may be formed in a plate 10 secured at the end of roller 2 to resist wear. By supporting the pivot $2^a$ of roller 2 and the roller locking pin 8 upon the same part the proper positions of the parts are maintained and strength of the parts is attained with lightness thereof. When the bolt 6 is withdrawn from support 4, lever $8^a$ will rock and withdraw locking pin 8 from the recess $2^b$ and release roller 2, and said pin will remain in its bearing $3^d$, and when bolt 6 is released to pass through recess $4^c$ of support 4 lever $8^a$ will be rocked to push pin 8 into recess $2^b$. The relative proportions of the parts is such that if, when the bolt 6 is released, the inner end of pin 8 should abut against the material between two adjacent recesses $2^b$, the pin would then be held withdrawn from a recess, but the free end of bolt 6 will have passed sufficiently into hole $4^c$ of support 4 to sustain the latter, and then when wind pressure upon the flexible shield 1 causes roller 2 to rotate slightly, and thereby a recess $2^b$ is brought in line with pin 8, the action of spring 7 on lever $8^a$ will be to push pin 8 into such recess $2^b$ to lock the roller, and the bolt 6 will slide farther into support 4.

To prevent the surfaces of the convolutions of the transparent flexible material 1 from contacting when wound upon roller 2, I provide a sheet of flexible material 11, such as suitable cloth, which may be made waterproof, and which winds upon the roller 2 with and between the convolutions of flexible material 1. The end of cloth 11 remote from roller 2 is secured to a spring-acting roller 12, like a shade roller but ratchetless, the pivots 12ª of roller 12 being carried by the supports 3ª at a suitable distance from and parallel with roller 2. The two sheets of flexible material 1 and 11 are, at adjacent ends, fastened to roller 2 and the latter will wind said sheets together in interposed convolutions or layers, as illustrated in Fig. 4. When flexible material 1 is raised and unwinds from roller 2 the cloth 11 will likewise unwind from said roller and will simultaneously therewith be wound upon roller 12. When flexible material 1 is lowered with its supports 4 and winds upon roller 2 the material 11 will likewise wind upon roller 2 and will unwind from roller 12, the spring of roller 12 always acting to maintain pull upon material 11, but the spring of roller 2 should be of greater tension than the spring of roller 12 so as to unwind the cloth 11 from the latter when roller 2 is winding the sheets of flexible material thereon. By this means a sufficient amount of cloth 11 is provided to be wound with the flexible material 1 upon roller 2 and yet such cloth is maintained in compact relation and adjacent roller 2. The advantage is that the surfaces of the convolutions of transparent flexible material 1, such as fiberloid, celluloid and the like, will not engage or abrade one another, and dust that may collect upon material 1 will, by contact with the relatively soft material 11, be prevented from injuring the surface of material 1, which might occur if rubbed by the relatively hard contacting surfaces of the latter. It will be observed that the rollers 2 and 12 are shown located behind and in line with the board a, and to protect said rollers and the coils of flexible material a protector 14 is provided, and which is shown carried by the plates 3 and secured thereto by screws 15.

To clean the inner surface of the flexible material 1 as the same is raised and lowered I provide soft material 16, such as cloth, felt or the like, which is shown secured to the edge of protector 14 and bearing against the rear surface of flexible material 1, which also serves to resist the deposit of dust upon the rolled-up flexible materials as well as the flow of water down to the rollers. To clean the front surface of shield material 1 I provide a strip of relatively soft material 17 which is shown bearing at one edge against material 1 and secured upon board a by means of a plate 18 held to the board by screws 19 which pass through the parts 17, 18. This also serves to prevent the flow of water between the parts 1 and 17. In my application for patent on shields for automobiles and other vehicles, filed December 8, 1910, Serial No. 596,707, I have shown a flexible shield and a strip of relatively soft material bearing against the same to clean the surface thereof, when the latter is raised and lowered, hence I do not in this application broadly claim the same. The arrangement of the slotted member or shield supporting part 4ª receiving the binding 5 at the end of the flexible shield material 1, with the supports or hangers 5ª, as well as the pair of rollers 2 and 12 having the soft flexible material or cloth 11 wound in with the convolutions of the transparent flexible shield material 1, may be utilized in connection with my last named shield, or in other shields of an analogous character.

My improvements are effective and safe in use, in that there is no glass required, and there is no obstruction above the transverse member 4ª, the shield being free and unobstructed above the same. The shield may be readily raised and lowered to the desired heights and be held in such positions; the parts are simple and cheap to manufacture, are relatively light in weight, and not liable to get out of order.

Changes may be made in the arrangements set forth, within the scope of the appended claims, without departing from the spirit of my invention.

Having now described my invention what I claim is:

1. The combination of a pair of rollers, a plurality of sheets of flexible material adapted to be wound upon one of said rollers in interposed convolutions, one end of one of said sheets of material being adapted to be wound upon the other of said rollers, the other of said sheets of material being free at one end from the first named roller to permit said sheet to be unwound from said roller.

2. The combination of a pair of rollers, a plurality of sheets of flexible material adapted to be wound upon one of said rollers in interposed convolutions, one end of one of said sheets of material being adapted to be wound upon the other of said rollers, the other of said sheets of material being free at one end from the first named roller to permit said sheet to be unwound from said roller, and means for supporting the free end of the last named sheet of material in different positions of elevation.

3. The combination of a pair of rollers, a plurality of sheets of flexible material connected with one of said rollers and adapted to wind thereon in interposed convolutions, the free end of one of said sheets of material being connected with the other of said rollers, and means for supporting the free end of the other sheet of said material in different positions of elevation.

4. The combination of a pair of spring-acting rollers, a plurality of sheets of flexible material connected at corresponding ends with one of said rollers and adapted to wind thereon in interposed convolutions, the free end of one of said sheets of material being connected with the other of said rollers to be wound thereon as unwound from the first named roller, the free end of the other sheet being free from both rollers, and means for supporting the free end of the last named sheet in different positions of elevation.

5. The combination of a pair of parallel spring-acting rollers spaced apart, the spring of one roller being of greater tension than the spring of the other roller, a plurality of sheets of flexible material secured to the roller having the stronger spring and rollable on said roller in interposed convolutions, one of said sheets of flexible material being connected with the other of said rollers to be wound thereon as unwound from the first named roller, and means connected with the free end of the other of said sheets of material to retain the same in different positions of elevation.

6. The combination of a pair of spring acting rollers spaced apart, the spring of one roller being of greater tension than the spring of the other roller, a plurality of sheets of flexible material adapted to be wound upon the roller having the stronger spring and rollable on said roller in interposed convolutions, one end of one of said sheets of material being adapted to be wound upon the roller having the weaker spring to be wound thereon as unwound from the first named roller, the other of said sheets of material being free at one end from the roller having the stronger spring to permit said sheet to be unwound from said roller.

7. The combination of a pair of spring acting rollers spaced apart, the spring of one roller being of greater tension than the spring of the other roller, a plurality of sheets of flexible material adapted to be wound upon the roller having the stronger spring and rollable on said roller in interposed convolutions, one end of one of said sheets of material being adapted to be wound upon the roller having the weaker spring to be wound thereon as unwound from the first named roller, the other of said sheets of material being free at one end from the roller having the stronger spring to permit said sheet to be unwound from said roller, and means for supporting the free end of the last named sheet of material in different positions of elevation.

Signed at New York city, in the county of New York, and State of New York, this 7th day of June, A. D. 1911.

THEODORE F. BOURNE.

Witnesses:
MAX M. KOTZEN,
MARIE F. WAINRIGHT.